United States Patent
Negishi et al.

(10) Patent No.: US 11,203,668 B2
(45) Date of Patent: Dec. 21, 2021

(54) POLYSILOXANE AND METHOD FOR PRODUCING SAME

(71) Applicant: SHIN-ETSU CHEMICAL CO., LTD., Tokyo (JP)

(72) Inventors: Kazuyuki Negishi, Annaka (JP); Yuji Yoshikawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 35 days.

(21) Appl. No.: 16/764,132

(22) PCT Filed: Nov. 13, 2018

(86) PCT No.: PCT/JP2018/041902
§ 371 (c)(1),
(2) Date: May 14, 2020

(87) PCT Pub. No.: WO2019/098163
PCT Pub. Date: May 23, 2019

(65) Prior Publication Data
US 2020/0392293 A1 Dec. 17, 2020

(30) Foreign Application Priority Data

Nov. 15, 2017 (JP) .......................... JP20107-219588

(51) Int. Cl.
| | | |
|---|---|---|
| *C08G 77/08* | (2006.01) | |
| *C08G 77/20* | (2006.01) | |
| *C08G 77/04* | (2006.01) | |
| *C08G 77/00* | (2006.01) | |

(52) U.S. Cl.
CPC .......... *C08G 77/20* (2013.01); *C08G 77/045* (2013.01); *C08G 77/08* (2013.01); *C08G 77/70* (2013.01)

(58) Field of Classification Search
CPC .......... C07F 7/21; C08G 77/12; C08G 77/20; C08G 77/18; C08G 77/045; C08G 77/08; C08L 83/04; B01J 23/40
See application file for complete search history.

(56) References Cited

U.S. PATENT DOCUMENTS

| | | |
|---|---|---|
| 4,260,726 A | 4/1981 | Deubzer et al. |
| 5,198,518 A | 3/1993 | Yamamoto et al. |
| 2005/0096415 A1 | 5/2005 | Akiyama et al. |
| 2007/0088144 A1* | 4/2007 | Kang .................. C09D 183/04 528/28 |
| 2010/0052114 A1 | 3/2010 | Hara et al. |
| 2010/0280210 A1 | 11/2010 | Kitamura et al. |

FOREIGN PATENT DOCUMENTS

| | | |
|---|---|---|
| JP | 54-159460 A | 12/1979 |
| JP | 2712817 B2 | 2/1998 |
| JP | 2005-97443 A | 4/2005 |
| JP | 2005-523377 A | 8/2005 |
| JP | 2006-237562 A | 9/2006 |
| JP | 2013-147659 A | 8/2013 |
| JP | 5590171 B2 | 9/2014 |
| WO | WO 2007/140012 A2 | 12/2007 |

OTHER PUBLICATIONS

International Search Report, issued in PCT/JP2018/041902, PCT/ISA/210, dated Jan. 15, 2019.
Written Opinion of the International Searching Authority, issued in PCT/JP2018/041902, PCT/ISA/237, dated Jan. 15, 2019.

* cited by examiner

*Primary Examiner* — Kuo Liang Peng
(74) *Attorney, Agent, or Firm* — Birch, Stewart, Kolasch & Birch, LLP

(57) ABSTRACT

This polysiloxane: comprises a hydrolytic condensation product of a silicon compound that contains a cyclic alkoxysiloxane represented by formula (1)

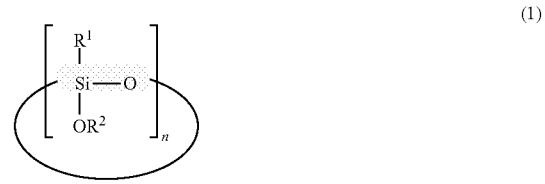

(in the formula, $R^1$ groups each independently denote a substituted or unsubstituted alkyl group having 1-3 carbon atoms, $R^2$ groups each independently denote a substituted or unsubstituted alkyl group having 1-6 carbon atoms, and n denotes an integer between 3 and 8); has at least two hydrosilylable carbon-carbon unsaturated groups per molecule; has at least two hydrosilyl groups per molecule; and in which the inequality $0.25 \leq t1 < 1$ is satisfied, where t1 denotes the molar ratio of T units having a group represented by $R^1$ relative to all siloxane units in the hydrolytic condensation product. The polysiloxane is addition crosslinkable, and is therefore suitable as a binder component of a heat-resistant paint or the like or as a coating material.

8 Claims, No Drawings

POLYSILOXANE AND METHOD FOR PRODUCING SAME

TECHNICAL FIELD

This invention relates to a polysiloxane and a method for preparing the same. More particularly, it relates to an addition crosslinkable polysiloxane having alkylsilsesquioxane units and a method for preparing the same.

BACKGROUND ART

Known in the art are organopolysiloxanes capable of addition crosslinking through hydrosilylation.

For example, Patent Document 1 discloses a heat curable resin composition comprising an addition crosslinkable organopolysiloxane having phenylsilsesquioxane units.

However, the inventors' study reveals that the addition crosslinkable organopolysiloxane having alkylsilsesquioxane units is difficult to synthesize because a corresponding monomer, alkyltrialkoxysilane compound undergoes a very fast hydrolytic condensation reaction so that gelation takes place.

Patent Document 2 discloses a technique of effecting hydrolysis of a mixture of alkoxysilanes containing methyltrimethoxysilane, while utilizing silanol groups resulting from hydrolysis of alkoxysilyl groups as a catalyst for the purpose of slowing down the rate of hydrolytic condensation. It is also disclosed that the hydrolytic condensation is followed by the steps of adding carboxylic acid or salt thereof and distilling off methanol. This enables to synthesize the organopolysiloxane without gelation.

Although the technique of Patent Document 2 is suited for the synthesis of low molecular weight organopolysiloxane, an attempt to synthesize relatively high molecular weight organopolysiloxane needs severer reaction conditions because of slow polymerization, raising problems including difficulty of reaction control, gelation, low reproducibility, and a lowering of working efficiency due to microgel generation.

Patent Document 3 discloses a method of synthesizing an organopolysiloxane comprising the steps of hydrolyzing a monomer mixture containing methyltrimethoxysilane in the presence of an alkaline hydrolytic catalyst, concentrating the reaction mixture, advancing polymerization to the desired molecular weight, distilling off alcohol by-product, then adding an acidic hydrolytic catalyst, effecting hydrolytic condensation of remaining alkoxy groups. The organopolysiloxane is synthesized without gelation or microgel generation.

Patent Document 3, however, cannot be applied to the synthesis of addition crosslinkable organopolysiloxane because hydrosilyl groups are decomposed under alkaline conditions.

PRIOR ART DOCUMENTS

Patent Documents

Patent Document 1: JP-A S54-159460
Patent Document 2: JP 2712817
Patent Document 3: JP 5590171

SUMMARY OF INVENTION

Technical Problem

An object of the invention, which has been made under the above-mentioned circumstances, is to provide an addition crosslinkable polysiloxane having alkylsilsesquioxane units and a method for preparing the polysiloxane efficiently while controlling gelation.

Solution to Problem

Making extensive investigations to attain the above object, the inventors have found that a desired addition crosslinkable polysiloxane having alkylsilsesquioxane units cures, on heating, into a cured product having improved heat resistance, and is thus suitable as a binder component in heat resistant paints or a coating material; and that by effecting hydrolytic condensation of an organosilicon compound containing a specific cyclic alkoxysiloxane, the desired polysiloxane can be prepared efficiently while controlling gelation. The invention is predicated on this finding.

The invention is defined below.

1. A polysiloxane comprising a hydrolytic condensate of a silicon compound containing a cyclic alkoxysiloxane having the formula (1):

[Chem. 1]

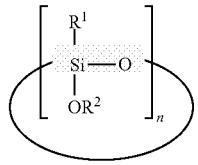

(1)

wherein $R^1$ is each independently a substituted or unsubstituted $C_1$-$C_3$ alkyl group, $R^2$ is each independently a substituted or unsubstituted $C_1$-$C_6$ alkyl group, and n is an integer of 3 to 8, the polysiloxane having at least two hydrosilylable carbon-carbon unsaturated groups per molecule and at least two hydrosilyl groups per molecule, wherein provided that t1 is a molar fraction of T units having group $R^1$ relative to all siloxane units in the hydrolytic condensate, t1 is in the range: $0.25 \leq t1 < 1$.

2. The polysiloxane of 1 which is a cohydrolytic condensate of the cyclic alkoxysiloxane having structural formula (1) and at least one compound selected from silicon compounds having the formulae (2) to (6):

[Chem. 2]

 (2)

 (3)

 (4)

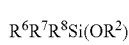 (5)

 (6)

wherein $R^2$ is as defined above, $R^3$ is hydrogen, a substituted or unsubstituted $C_2$-$C_6$ alkenyl group, or $C_6$-$C_{18}$ aryl group, $R^4$, $R^5$, $R^6$, $R^7$ and $R^8$ are each independently hydrogen or a substituted or unsubstituted $C_1$-$C_{18}$ monovalent hydrocarbon group.

3. The polysiloxane of 2 wherein provided that q is a molar fraction of Q units, t2 is a molar fraction of T units having group $R^3$, d is a molar fraction of D units, and m is a molar fraction of M units, q, t1, t2, d and m are in the range: $0 \le q \le 0.5$, $0.25 \le t1 < 1$, $0 \le t2 \le 0.5$, $0 \le d \le 0.7$, $0 \le m \le 0.5$, and $q+t1+t2+d+m=1$.

4. The polysiloxane of 2 or 3 wherein $R^1$ is methyl, $R^2$ is each independently methyl or ethyl, $R^3$ is each independently hydrogen, vinyl or phenyl, $R^4$, $R^5$, $R^6$, $R^7$ and $R^8$ are each independently hydrogen, methyl, vinyl or phenyl, and n is 4 or 5.

5. A method for preparing a polysiloxane comprising the step of effecting cohydrolytic condensation of a cyclic alkoxysiloxane having the formula (1) and at least one compound selected from silicon compounds having the formulae (2) to (6):

[Chem. 3]

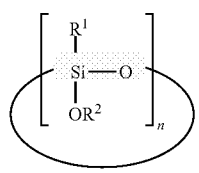
(1)

Si(OR$^2$)$_4$ (2)

R$^3$Si(OR$^2$)$_3$ (3)

R$^4$R$^5$Si(OR$^2$)$_2$ (4)

R$^6$R$^7$R$^8$Si(OR$^2$) (5)

R$^6$R$^7$R$^8$SiOSiR$^6$R$^7$R$^8$ (6)

wherein $R^1$ is each independently a substituted or unsubstituted $C_1$-$C_3$ alkyl group, $R^2$ is each independently a substituted or unsubstituted $C_1$-$C_6$ alkyl group, $R^3$ is hydrogen, a substituted or unsubstituted $C_2$-$C_6$ alkenyl group, or $C_6$-$C_{18}$ aryl group, $R^4$, $R^5$, $R^6$, IC and $R^8$ are each independently hydrogen or a substituted or unsubstituted $C_1$-$C_{18}$ monovalent hydrocarbon group, and n is an integer of 3 to 8, with the proviso that at least two of $R^3$, $R^4$, $R^5$, $R^6$, $R^7$ and $R^8$ are hydrogen, and at least two thereof are a substituted or unsubstituted $C_2$-$C_6$ alkenyl group.

6. The method of 5 wherein $R^1$ is methyl, $R^2$ is each independently methyl or ethyl, $R^3$ is each independently hydrogen, vinyl or phenyl, $R^4$, $R^5$, $R^6$, IC and $R^8$ are each independently hydrogen, methyl, vinyl or phenyl, and n is 4 or 5.

7. A heat curable composition comprising the polysiloxane of any one of 1 to 4 and a platinum base catalyst, the platinum base catalyst being present in such an amount as to give $0.01 \times 10^{-4}$ to $50 \times 10^{-4}$ part by weight of platinum per 100 parts by weight of the polysiloxane.

8. A cured product of the composition of 7.

Advantageous Effects of Invention

A composition comprising an addition crosslinkable polysiloxane having alkylsilsesquioxane units cures, on heating, into a cured product having improved heat resistance, and is thus best suited as a binder component in heat resistant paints, heat resistant resins or the like, a coating material for building members, molded parts or the like, or a coating or encapsulating material for electronic parts.

The inventive method is successful in preparing an addition crosslinkable polysiloxane having alkylsilsesquioxane units efficiently while controlling gelation.

DESCRIPTION OF EMBODIMENTS

Now the invention is described in detail.

The invention provides a polysiloxane comprising a hydrolytic condensate of a silicon compound containing a cyclic alkoxysiloxane having the formula (1), the polysiloxane having at least two hydrosilylable carbon-carbon unsaturated groups per molecule and at least two hydrosilyl groups per molecule. Provided that t1 is a molar fraction of T units having group $R^1$ relative to all siloxane units in the hydrolytic condensate, t1 is in the range: $0.25 \le t1 < 1$.

[Chem. 4]

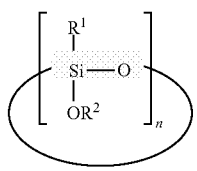
(1)

In formula (1), $R^1$ is each independently a substituted or unsubstituted $C_1$-$C_3$ alkyl group, $R^2$ is each independently a substituted or unsubstituted $C_1$-$C_6$ alkyl group, and n is an integer of 3 to 8.

The $C_1$-$C_3$ alkyl group $R^1$ may be straight, branched or cyclic. Examples include methyl, ethyl, n-propyl, and isopropyl. Inter alia, methyl and ethyl are preferred, with methyl being more preferred.

The $C_1$-$C_6$ alkyl group $R^1$ may be straight, branched or cyclic. Examples include methyl, ethyl, n-propyl, isopropyl, n-butyl, isobutyl, tert-butyl, neopentyl, n-hexyl and cyclohexyl. Inter alia, $C_1$-$C_3$ alkyl groups are preferred, with methyl and ethyl being more preferred.

In the foregoing alkyl groups, some or all hydrogen atoms may be substituted by substituents such as halogen atoms (fluorine, chlorine, bromine and iodine), cyano groups or the like. Exemplary substituted groups include chloromethyl, chloropropyl, bromoethyl, trifluoropropyl, and cyanoethyl.

The subscript n is an integer of 3 to 8, preferably 4, 5 or 6. Most preferably, n is 4 for industrial availability.

As defined above, the polysiloxane has at least two, preferably at least three hydrosilylable carbon-carbon unsaturated groups per molecule, and at least two, preferably at least three hydrosilyl groups per molecule. Because of such functional groups included, the polysiloxane can be cured through hydrosilylation reaction.

The hydrosilylable carbon-carbon unsaturated groups are preferably substituted or unsubstituted $C_2$-$C_6$ alkenyl groups, for example, vinyl, 1-propenyl, allyl (or 2-propenyl), hexenyl, octenyl, cyclopentenyl, and cyclohexenyl, with vinyl being most preferred.

The content of hydrosilylable carbon-carbon unsaturated groups in the polysiloxane is preferably in a range of 0.025 to 0.5 mole, more preferably 0.05 to 0.4 mole per mole of silicon atom. This range ensures effective progress of crosslinking reaction.

The content of hydrosilyl groups in the polysiloxane is preferably 0.025 to 0.5 mole, more preferably 0.05 to 0.4 mole per mole of silicon atom.

Also preferably, the molar amount of hydrosilyl groups is 0.5 to 5.0 times, more preferably 0.7 to 4.0 times, even more preferably 0.7 to 2.0 times the total moles of hydrosilylable carbon-carbon unsaturated groups. This range ensures efficient progress of crosslinking reaction.

While the inventive polysiloxane is a hydrolytic condensate of a silicon compound containing a cyclic alkoxysiloxane having formula (1), it is not particularly limited as long as it has the above-defined numbers of carbon-carbon unsaturated groups and hydrosilyl groups. Preferably the polysiloxane is a cohydrolytic condensate of the cyclic alkoxysiloxane having formula (1) and at least one compound selected from silicon compounds having the formulae (2) to (6).

[Chem. 5]

$$Si(OR^2)_4 \qquad (2)$$

$$R^3Si(OR^2)_3 \qquad (3)$$

$$R^4R^5Si(OR^2)_2 \qquad (4)$$

$$R^6R^7R^8Si(OR^2) \qquad (5)$$

$$R^6R^7R^8SiOSiR^6R^7R^8 \qquad (6)$$

In these formulae, $R^2$ is as defined above, $R^3$ is hydrogen, a substituted or unsubstituted $C_2$-$C_6$ alkenyl group, or a $C_6$-$C_{18}$ aryl group, $R^4$, $R^5$, $R^6$, $R^7$ and $R^8$ are each independently hydrogen or a substituted or unsubstituted $C_1$-$C_{18}$ monovalent hydrocarbon group.

Examples of the $C_2$-$C_6$ alkenyl group represented by $R^3$ include vinyl, 1-propenyl, allyl (or 2-propenyl), hexenyl, octenyl, cyclopentenyl, and cyclohexenyl, with vinyl being preferred.

In the alkenyl groups, some or all hydrogen atoms may be substituted by substituents such as halogen atoms (fluorine, chlorine, bromine and iodine), cyano groups or the like.

Examples of the $C_6$-$C_{18}$ aryl group include unsubstituted aryl groups such as phenyl and naphthyl; and $C_7$-$C_{18}$ alkylaryl groups such as tolyl, xylyl, ethylphenyl, propylphenyl, butylphenyl, pentylphenyl, hexylphenyl, heptylphenyl, octylphenyl, nonylphenyl, decylphenyl, undecylphenyl, and dodecylphenyl, with phenyl being preferred.

Examples of the $C_1$-$C_{18}$ monovalent hydrocarbon groups represented by $R^4$ to $R^8$ include $C_1$-$C_{18}$ alkyl groups such as methyl, ethyl, n-propyl, isopropyl, n-butyl, isobutyl, sec-butyl, tert-butyl, n-pentyl, n-hexyl, n-octyl, n-decyl, cyclopentyl, cyclohexyl; alkenyl groups such as vinyl, 1-propenyl, allyl (or 2-propenyl), hexenyl, octenyl, cyclopentenyl, cyclohexenyl; unsubstituted aryl groups such as phenyl and naphthyl; alkylaryl groups such as tolyl, xylyl, ethylphenyl, propylphenyl, butylphenyl, pentylphenyl, hexylphenyl, heptylphenyl, octylphenyl, nonylphenyl, decylphenyl, undecylphenyl, and dodecylphenyl; and aralkyl groups such as benzyl and phenethyl.

Among these, alkyl groups are preferably of 1 to 4 carbon atoms, more preferably methyl and ethyl. Alkenyl groups are preferably of 2 to 4 carbon atoms, more preferably allyl (or 2-propenyl) and vinyl. Aryl groups are preferably unsubstituted $C_6$-$C_{12}$ aryl groups, more preferably phenyl.

In the foregoing monovalent hydrocarbon groups, some or all hydrogen atoms may be substituted by substituents. Suitable substituents include halogen atoms such as fluorine, chlorine, and bromine and reactive groups such as glycidoxy, acryloyl, methacryloyl, acryloyloxy, methacryloyloxy, amino, mercapto, and hydroxyl.

In the inventive polysiloxane, provided that t1 is a molar fraction of T units having group $R^1$ relative to all siloxane units in the hydrolytic condensate, t1 is in the range: $0.25 \le t1 < 1$, preferably $0.3 \le t1 < 1$. If t1 is less than 0.25, a polysiloxane is reduced in crosslinking density, resulting in a coating or molding with reduced strength.

Further in the inventive polysiloxane, provided that q is a molar fraction of Q units, t2 is a molar fraction of T units having group $R^3$, d is a molar fraction of D units, and m is a molar fraction of M units relative to all siloxane units, q+t1+t2+d+m=1, q, t2, d and m are preferably in the following range.

Specifically, q is preferably in the range: $0 \le q \le 0.5$ where gelation is rather unlikely to occur during polymerization, more preferably $0 \le q \le 0.2$;

t2 is preferably in the range: $0 \le t2 \le 0.5$ where gelation is rather unlikely to occur during polymerization, more preferably $0 \le t2 \le 0.3$;

d is preferably in the range: $0 \le d \le 0.7$ from the aspects of suppressing a drop of crosslinking density and increasing the strength of a coating or molding, more preferably $0 \le d \le 0.5$; and m is preferably in the range: $0 \le m \le 0.5$ from the aspects of preventing the polysiloxane from becoming a too low molecular weight and obtaining a coating or molding with strength, more preferably $0 \le m \le 0.4$.

The polysiloxane preferably has a weight average molecular weight (Mw) of 500 to 100,000, more preferably 1,000 to 60,000, as measured by gel permeation chromatography (GPC) versus polystyrene standards although the average molecular weight is not particularly limited. With a Mw in the range, a cured product has better strength and heat resistance and is easy to handle.

The polysiloxane preferably has a viscosity of 1 to 50,000 mPa·s, more preferably 10 to 30,000 mPa·s, in view of efficient working and ease of reaction control, although the viscosity is not particularly limited. As used herein, the viscosity is measured at 25° C. by a spindle type rotational viscometer according to JIS Z 8803 9.2.

The invention also provides a method for preparing a polysiloxane comprising the step of effecting cohydrolytic condensation of a cyclic alkoxysiloxane having the formula (1) and at least one compound selected from silicon compounds having the formulae (2) to (6). Herein, the amount of the cyclic alkoxysiloxane having formula (1) is from 25 mol % to less than 100 mol % based on the total of silicon compounds subject to cohydrolytic condensation.

[Chem. 6]

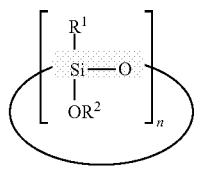

(1)

$$Si(OR^2)_4 \qquad (2)$$

$$R^3Si(OR^2)_3 \qquad (3)$$

$$R^4R^5Si(OR^2)_2 \quad (4)$$

$$R^6R^7R^8Si(OR^2) \quad (5)$$

$$R^6R^7R^8SiOSiR^6R^7R^8 \quad (6)$$

In the above formulae, $R^1$ to $R^8$ and n are as defined above. At least two of $R^3$, $R^4$, $R^5$, $R^6$, $R^7$ and $R^8$ are hydrogen, and at least two thereof are substituted or unsubstituted $C_2$-$C_6$ alkenyl groups. Suitable alkenyl groups are as exemplified above.

It is believed that since the cyclic alkoxysiloxane having formula (1) has a cyclic structure having high planarity, three-dimensional crosslinking during polymerization is restrained and gelation is prevented. Also, the alkylsilsesquioxane unit derived from the cyclic alkoxysiloxane having formula (1) has only 1 to 3 carbon atoms per silicon atom, it has superior heat resistance at 700° C. to the phenylsilsesquioxane unit having 6 carbon atoms per silicon atom.

Understandably, the method for preparing a polysiloxane according to the invention is advantageous in that an organopolysiloxane which gives a cured product having heat resistance at a high temperature of the order of 700° C. can be synthesized without gelation.

The cyclic alkoxysiloxane having formula (1) may be used alone or in admixture, and even a mixture of two or more hydrolytic condensates thereof is acceptable.

Examples of the cyclic alkoxysiloxane having formula (1) include compounds having the formulae (1A) to (1H) below, but are not limited thereto.

[Chem. 7]

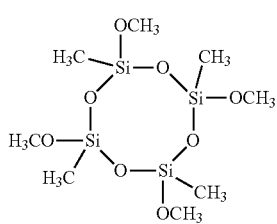
(1A)

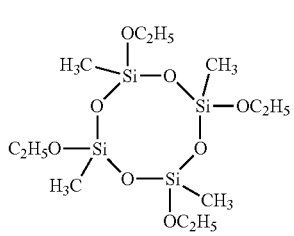
(1B)

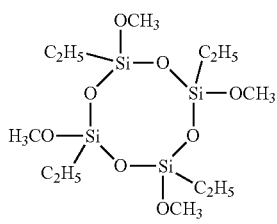
(1C)

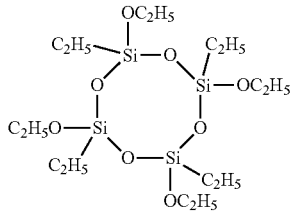
(1D)

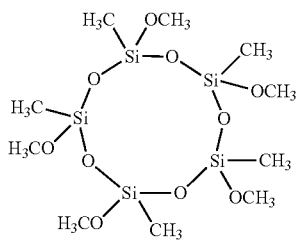
(1E)

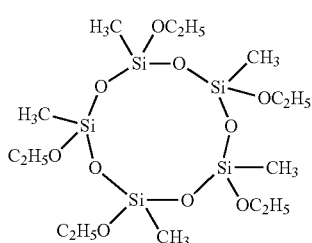
(1F)

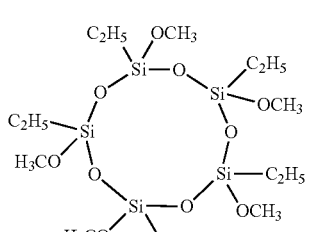
(1G)

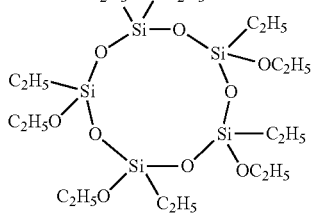
(1H)

Examples of the silicon compounds to be subject to cohydrolytic condensation together with the cyclic alkoxysiloxane having formula (1) are shown below. These silicon compounds may be used alone or in admixture, and even hydrolytic condensates thereof are acceptable.

Suitable tetraalkoxysilanes include tetramethoxysilane, tetraethoxysilane, tetra-n-propoxysilane, tetraisopropoxysilane, tetra-n-butoxysilane, tetra-sec-butoxysilane, and tetra-tert-butoxysilane.

Suitable trialkoxysilanes include phenyltrimethoxysilane, cyclohexyltrimethoxysilane, vinyltrimethoxysilane, vinyltriethoxysilane, 5-hexenyltrimethoxysilane, 4-vinylphenyltrimethoxysilane, 3-(4-vinylphenyl)propyltrimethoxysilane, 4-vinylphenylmethyltrimethoxysilane, 3-glycidoxypropyltrimethoxysilane, 3-glycidoxypropyltriethoxysilane, 3-(meth)acryloxypropyltrimethoxysilane, 3-(meth)acryloxypropyltriethoxysilane, 3-aminopropyltrimethoxysilane, 3-aminopropyltriethoxysilane, 3-(2-aminoethyl)aminopropyltrimethoxysilane, 3-mercaptopropyltrimethoxysilane, and 3-mercaptopropyltriethoxysilane.

Suitable dialkoxysilanes include dimethyldimethoxysilane, dimethyldiethoxysilane, dimethyldiisopropoxysilane, dimethyldibutoxysilane, dimethyldiisopropenoxysilane, propylmethyldimethoxysilane, hexylmethyldimethoxysilane, phenylmethyldimethoxysilane, diphenyldimethoxysilane, vinylmethyldimethoxysilane, vinylmethyldiethoxysilane, 3-glycidoxypropylmethyldimethoxysilane, 3-glycidoxypropylmethyldiethoxysilane, 3-(meth)acryloxypropylmethyldimethoxysilane, 3-(meth)acryloxypropylmethyldimethoxysilane, 3-aminopropylmethyldimethoxysilane, 3-aminopropylmethyldiethoxysilane, 3-mercaptopropylmethyldimethoxysilane, and 3-mercaptopropylmethyl diethoxysilane.

Suitable monoalkoxysilanes include trimethylmethoxysilane, trimethylethoxysilane, dimethylmethoxysilane, dimethylethoxysilane, vinyldimethylmethoxysilane, and vinyldimethylethoxysilane. Also included are hydrolytic condensates thereof such as hexamethyldisiloxane, tetramethyldisiloxane, and 1,3-divinyltetramethyldisiloxane.

The cohydrolytic condensation of a cyclic alkoxysiloxane having formula (1) and one or more silicon compounds may be effected by any well-known methods.

When the amount of water added for hydrolysis is less than the necessary amount to hydrolyze all alkoxy groups in the reactants, the resulting polysiloxane contains more hydrolyzable groups such as methoxy or ethoxy groups. When water is added in a more amount than the necessary amount to hydrolyze all alkoxy groups, the resulting polysiloxane contains more silanol groups.

Also, the cohydrolytic condensation reaction may be effected in the presence of an organic solvent if necessary.

Examples of the organic solvent include aromatic hydrocarbons such as toluene and xylene, aliphatic hydrocarbons such as hexane and octane, ketones such as methyl ethyl ketone and methyl isobutyl ketone, esters such as ethyl acetate and isobutyl acetate, and alcohols such as methanol, ethanol, isopropanol, butanol, isobutanol and t-butanol.

A hydrolytic catalyst may be used in effecting hydrolysis.

Although any well-known catalysts may be used as the hydrolytic catalyst, those catalysts which exhibit an acidity of pH 2 to 7 in aqueous solution form are preferred. Especially, acidic hydrogen halides, carboxylic acids, sulfonic acids, acidic or weakly acidic inorganic salts, and solid acids such as ion exchange resins are preferred.

Suitable acidic catalysts include hydrogen fluoride, hydrochloric acid, nitric acid, sulfuric acid, organic carboxylic acids such as acetic acid and maleic acid, methanesulfonic acid, and cation exchange resins having sulfonate or carboxylate groups on their surface.

Of these, methanesulfonic acid, hydrochloric acid, and nitric acid are preferred, with methanesulfonic acid being more preferred in view of reactivity.

The amount of the hydrolytic catalyst is preferably 0.001 to 10 mol % per mole of hydrolyzable groups on silicon atoms.

The (first) step of hydrolysis is preferably followed by the (second) step of distilling off the reaction solvent, by-products, residual monomers and water.

A heat curable composition is obtainable by adding a hydrosilylation catalyst to the inventive polysiloxane.

The hydrosilylation catalyst may be selected from well-known catalysts capable of promoting addition reaction or hydrosilylation reaction of organopolysiloxane, preferably platinum base catalysts.

Suitable platinum base catalysts include chloroplatinic acid, chloroplatinic acid-olefin complexes, chloroplatinic acid-divinyltetramethyldisiloxane complexes, chloroplatinic acid-alcohol coordination compounds, and platinum-diketone complexes, which may be used alone or in admixture.

The amount of the platinum base catalyst used is preferably $0.01 \times 10^{-4}$ to $50 \times 10^{-4}$ part by weight, more preferably $0.1 \times 10^{-4}$ to $30 \times 10^{-4}$ part by weight of platinum per 100 parts by weight of the organopolysiloxane.

In the heat curable composition, an inhibitor may be blended for insuring a pot life.

The inhibitor is not particularly limited as long as it has a cure inhibiting effect to the platinum catalyst. Suitable inhibitors include phosphorus-containing compounds such as triphenylphosphine; nitrogen-containing compounds such as tributylamine, tetramethylethylenediamine, and benzotriazole; sulfur-containing compounds such as mercaptobenzothiazole, zinc mercaptobenzothiazole, sodium mercaptobenzothiazole and 2,2-dibenzothiazolyl disulfide; acetylene alcohol compounds such as 1-ethynylcyclohexanol and 3,5-dimethyl-1-hexyn-3-ol; acetylene compounds such as bis[(1,1-dimethyl-2-propinyl)oxy]methylphenylsilane; compounds having at least two alkenyl groups; hydroperoxy compounds; and maleic acid derivatives.

The heat curable composition may further comprise a diluent solvent.

The diluent solvent is not particularly limited as long as the inventive organopolysiloxane is dissolvable or dispersible therein. Examples include aromatic hydrocarbons such as toluene and xylene, hydrocarbons such as hexane and octane, ketones such as methyl ethyl ketone and methyl isobutyl ketone, esters such as ethyl acetate and isobutyl acetate, and alcohols such as methanol, ethanol, isopropanol, butanol, isobutanol and t-butanol.

The method of preparing the heat curable composition is not particularly limited. The organopolysiloxane may be mixed with the platinum base catalyst by any suitable means.

The composition may be cured under curing conditions commonly used for prior art well-known addition type organopolysiloxane compositions, for example, by heating at 50 to 200° C. for about 10 minutes to about 24 hours.

In the heat curable composition, other additives may be added as long as the benefits of the invention are not compromised.

Suitable additives include inorganic fillers, phosphors, silane coupling agents, adhesion aids, and antidegradants.

Since cured products obtained from the hydrolytic condensate and the composition comprising the same have heat resistance, they are advantageously utilized as a binder component for heat resisting paint and resins, a coating material for building members and molded parts, and a coating or encapsulating material for electronic parts.

EXAMPLES

Examples and Comparative Examples are given below for further illustrating the invention although the invention is not limited thereto.

Herein, the weight average molecular weight (Mw) is measured by gel permeation chromatography (GPC, model HLC-8320GPC EccSEC by Tosoh Corp.) using tetrahydrofuran as developing solvent versus polystyrene standards.

The viscosity is measured at 25° C. by a spindle type rotational viscometer according to JIS Z 8803 9.2.

The values of q, t1, t2, d and m are computed from the results of $^1$H-NMR spectroscopy (system ULTRA SHIELD 400 Plus by Bruker) and $^{29}$Si-NMR spectroscopy (system JNM-ECX5002 by JEOL Ltd.). Abbreviations designate the following siloxane units, Q: $SiO_{4/2}$, $T^{Me}$: $MeSiO_{3/2}$, $T^{H}$: $HSiO_{3/2}$, $T^{Vi}$: $ViSiO_{3/2}$, $T^{\Phi}$: $PhSiO_{3/2}$, $MeHSiO_{2/2}$, $D^{Vi}$: $ViHSiO_{2/2}$, $M^H$: $Me_2HSiO_{1/2}$, $M^{Vi}$: $Me_2ViSiO_{1/2}$, and M: $Me_3SiO_{1/2}$ wherein Me stands for methyl, Vi for vinyl, and Ph for phenyl.

(1) Synthesis of Polysiloxane

Example 1-1

A glass flask equipped with a stirrer, thermometer, condenser and dropping funnel was charged with 675 g of a cyclic alkoxysiloxane having formula (1A), synthesized according to the procedure of Example 26 of WO 2007/140012, 183 g of trimethoxysilane, 222 g of vinyltrimethoxysilane, 302 g of tetramethyldisiloxane, and 977 g of toluene, so that the alkoxysiloxane might consist of 50 mol % $T^{Me}$ units, 10 mol % $T^H$ units, 10 mol % $T^{Vi}$ units, and 30 mol % $M^H$ units. With stirring, 15 g of methanesulfonic acid was admitted, and 156 g of water was added dropwise over 1 hour. This was followed by aging at 67° C. for 2 hours and further aging at 80° C. for 3 hours. The reaction mixture was washed with water until the extraction water became neutral. Then the solvent was distilled off, yielding a product.

The organopolysiloxane thus obtained had Mw 47,000 and viscosity 18,300 mPa·s. The fractions of constituent units as computed from the data of NMR spectroscopy were q=0, t1=0.54, t2=0.22, d=0, and m=0.24.

Examples 1-2 to 1-5 and Comparative Examples 1-1 to 1-4

Organopolysiloxanes were synthesized by the same procedure as in Example 1-1 except changes of molar ratio as shown in Table 1. The molar fractions of constituent units as computed from the data of NMR spectroscopy are shown in Tables 1 and 2.

TABLE 1

| | | Example 1-1 | Example 1-2 | Example 1-3 | Example 1-4 | Example 1-5 |
|---|---|---|---|---|---|---|
| Polysiloxane | | A-1 | A-2 | A-3 | A-4 | A-5 |
| Q unit | $Si(OMe)_4$ | 0 | 0 | 0.10 | 0 | 0 |
| T unit | Compound (1A) | 0.50 | 0.50 | 0.40 | 0.80 | 0.50 |
| | $MeSi(OMe)_3$ | 0 | 0 | 0 | 0 | 0 |
| | $HSi(OMe)_3$ | 0.10 | 0 | 0 | 0 | 0 |
| | $ViSi(OMe)_3$ | 0.10 | 0 | 0 | 0 | 0 |
| D unit | $MeHSi(OMe)_2$ | 0 | 0.15 | 0.15 | 0 | 0.125 |
| | $MeViSi(OMe)_2$ | 0 | 0.15 | 0.15 | 0 | 0.125 |
| M unit | $HMe_2SiOSiMe_2H$ | 0.15 | 0 | 0 | 0.05 | 0 |
| | $ViMe_2SiOSiMe_2Vi$ | 0 | 0 | 0 | 0.05 | 0 |
| | $Me_3SiOSiMe_3$ | 0 | 0.10 | 0.10 | 0 | 0.125 |
| Molecular weight | (Mw) | 47,000 | 13,000 | 35,000 | 7,800 | 4,600 |
| q | Q | 0 | 0 | 0.11 | 0 | 0 |
| t1 | $T^{Me}$ | 0.54 | 0.55 | 0.43 | 0.84 | 0.48 |
| t2 | $T^H$ | 0.11 | 0 | 0 | 0 | 0 |
| | $T^{Vi}$ | 0.11 | 0 | 0 | 0 | 0 |
| | $T^{\Phi}$ | 0 | 0 | 0 | 0 | 0 |
| d | $D^H$ | 0 | 0.15 | 0.15 | 0 | 0.14 |
| | $D^{Vi}$ | 0 | 0.15 | 0.15 | 0 | 0.14 |
| m | $M^H$ | 0.24 | 0 | 0 | 0.09 | 0 |
| | $M^{Vi}$ | 0 | 0 | 0 | 0.07 | 0 |
| | M | 0 | 0.15 | 0.16 | 0 | 0.24 |
| H/Vi | | 3.2 | 1.0 | 1.0 | 1.3 | 1.0 |

TABLE 2

| | | Comparative Example 1-1 | Comparative Example 1-2 | Comparative Example 1-3 | Comparative Example 1-4 |
|---|---|---|---|---|---|
| Polysiloxane | | B-1 | B-2 | B-3 | B-4 |
| Q unit | $Si(OMe)_4$ | 0 | 0 | 0 | 0 |
| T unit | Compound (1A) | 0 | 0 | 0 | 0 |
| | $MeSi(OMe)_3$ | 0.50 | 0.50 | 0.80 | 0 |
| | $HSi(OMe)_3$ | 0 | 0.10 | 0 | 0 |
| | $ViSi(OMe)_3$ | 0 | 0.10 | 0 | 0 |
| | $PhSi(OMe)_3$ | 0 | 0 | 0 | 0.50 |
| D unit | $MeHSi(OMe)_2$ | 0.15 | 0 | 0 | 0.125 |
| | $MeViSi(OMe)_2$ | 0.15 | 0 | 0 | 0.125 |
| M unit | $HMe_2SiOSiMe_2H$ | 0 | 0.15 | 0.05 | 0 |
| | $ViMe_2SiOSiMe_2Vi$ | 0 | 0 | 0.05 | 0 |
| | $Me_3SiOSiMe_3$ | 0.10 | 0 | 0 | 0.125 |
| Molecular weight | (Mw) | gelation | gelation | gelation | 2,500 |
| q | Q | — | — | — | 0 |
| t1 | $T^{Me}$ | — | — | — | 0 |
| t2 | $T^H$ | — | — | — | 0 |
| | $T^{Vi}$ | — | — | — | 0 |
| | $T^{\Phi}$ | — | — | — | 0.49 |

TABLE 2-continued

|   |       | Comparative Example 1-1 | Comparative Example 1-2 | Comparative Example 1-3 | Comparative Example 1-4 |
|---|-------|---|---|---|---|
| d | $D^H$ | — | — | — | 0.13 |
|   | $D^{Vi}$ | — | — | — | 0.13 |
| m | $M^H$ | — | — | — | 0 |
|   | $M^{Vi}$ | — | — | — | 0 |
|   | M     | — | — | — | 0.25 |
| H/Vi |    | — | — | — | 1.0 |

As seen from Tables 1 and 2, the desired polysiloxanes were prepared in Examples 1-1 to 1-5 without gelation during hydrolytic condensation.

In contrast, Comparative Examples 1-1 to 1-3 attempting synthesis using methyltrimethoxysilane instead of compound (1A) failed to prepare the desired polysiloxanes because gelation occurred during hydrolytic condensation.

(2) Preparation of Heat Curable Composition and Cured Product Thereof

Example 2-1

A heat curable composition was prepared by adding a platinum catalyst (platinum(0)-1,3-divinyltetramethyldisiloxane complex, Pt content 0.08 wt %) in an amount to give $10 \times 10^{-4}$ part by weight of Pt to 100 parts by weight of polysiloxane (A-1) in Example 1-1, and mixing at 25° C. for dissolution.

Examples 2-2 to 2-5 and Comparative Example 2-1

Heat curable compositions were prepared as in Example 2-1 except changes of compositional ratio as shown in Table 3.

Each of the heat curable compositions of Examples 2-1 to 2-5 and Comparative Example 2-1 was cast into a mold, heated at 200° C. for 16 hours, and allowed to cool down to 25° C., obtaining a cured product of 1.3 mm thick. The cured product was measured for a heating loss at 700° C. in air by analyzer TG-DTA (Thermo plus EVO2, Rigaku Corp.). The results are shown in Table 3.

TABLE 3

|   | Example 2-1 | Example 2-2 | Example 2-3 | Example 2-4 | Example 2-5 | Comparative Example 2-1 |
|---|---|---|---|---|---|---|
| A-1 (pbw) | 100 | | | | | |
| A-2 (pbw) | | 100 | | | | |
| A-3 (pbw) | | | 100 | | | |
| A-4 (pbw) | | | | 100 | | |
| A-5 (pbw) | | | | | 100 | |
| B-4 (pbw) | | | | | | 100 |
| Pt content ($\times 10^{-4}$ pbw) | 10 | 10 | 10 | 10 | 10 | 10 |
| Heating loss @700° C. (%) | 13 | 19 | 19 | 16 | 22 | 42 |

As shown in Table 3, the cured products of Examples 2-1 to 2-5 obtained from the heat curable compositions comprising polysiloxanes (A-1) to (A-5) within the scope of the invention have excellent heat resistance.

The polysiloxane (B-4) of Comparative Example 1-4 has the structure in which the methylsilsesquioxane unit of polysiloxane (A-5) of Example 1-5 is replaced by phenylsilsesquioxane unit. The cured product of Comparative Example 2-1 obtained from the heat curable composition comprising polysiloxane (B-4) shows inferior heat resistance to the cured product of Example 2-5 as demonstrated by a large loss at 700° C.

The invention claimed is:

1. A polysiloxane comprising a hydrolytic condensate of a silicon compound containing a cyclic alkoxysiloxane having the formula (1):

[Chem. 1]

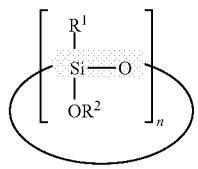

(1)

wherein $R^1$ is each independently a substituted or unsubstituted $C_1$-$C_3$ alkyl group, $R^2$ is each independently a substituted or unsubstituted $C_1$-$C_6$ alkyl group, and n is an integer of 3 to 8, the polysiloxane having at least two hydrosilylable carbon-carbon unsaturated groups per molecule and at least two hydrosilyl groups per molecule, wherein provided that t1 is a molar fraction of T units having group $R^1$ relative to all siloxane units in the hydrolytic condensate, t1 is in the range: $0.25 \leq t1 < 1$.

2. The polysiloxane of claim 1 which is a cohydrolytic condensate of the cyclic alkoxysiloxane having structural formula (1) and at least one compound selected from silicon compounds having the formulae (2) to (6):

[Chem. 2]

(2)

(3)

$R^4R^5Si(OR^2)_2$ (4)

$R^6R^7R^8Si(OR^2)$ (5)

$R^6R^7R^8SiOSiR^6R^7R^8$ (6)

wherein $R^2$ is as defined above, $R^3$ is hydrogen, a substituted or unsubstituted $C_2$-$C_6$ alkenyl group, or $C_6$-$C_{18}$ is aryl group, $R^4$, $R^5$, $R^6$, $R^7$ and $R^8$ are each independently hydrogen or a substituted or unsubstituted $C_1$-$C_{18}$ monovalent hydrocarbon group.

3. The polysiloxane of claim 2 wherein provided that q is a molar fraction of Q units, t2 is a molar fraction of T units having group $R^3$, d is a molar fraction of D units, and m is a molar fraction of M units, q, t1, t2, d and m are in the range: $0 \leq q \leq 0.5$, $0.25 \leq t1 < 1$, $0 \leq t2 \leq 0.5$, $0 \leq d \leq 0.7$, $0 \leq m \leq 0.5$, and $q+t1+t2+d+m=1$.

4. The polysiloxane of claim 2 wherein $R^1$ is methyl, $R^2$ is each independently methyl or ethyl, $R^3$ is each independently hydrogen, vinyl or phenyl, $R^4$, $R^5$, $R^6$, $R^7$ and $R^8$ are each independently hydrogen, methyl, vinyl or phenyl, and n is 4 or 5.

5. A heat curable composition comprising the polysiloxane of claim 1 and a platinum base catalyst,
the platinum base catalyst being present in such an amount as to give $0.01 \times 10^{-4}$ to $50 \times 10^{-4}$ part by weight of platinum per 100 parts by weight of the polysiloxane.

6. A cured product of the composition of claim 5.

7. A method for preparing a polysiloxane comprising the step of effecting cohydrolytic condensation of a cyclic alkoxysiloxane having the formula (1) and at least one compound selected from silicon compounds having the formulae (2) to (6):

[Chem. 3]

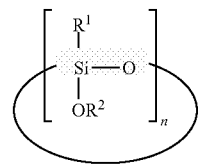
(1)

$Si(OR^2)_4$ (2)

$R^3Si(OR^2)_3$ (3)

$R^4R^5Si(OR^2)_2$ (4)

$R^6R^7R^8Si(OR^2)$ (5)

$R^6R^7R^8SiOSiR^6R^7R^8$ (6)

wherein $R^1$ is each independently a substituted or unsubstituted $C_1$-$C_3$ alkyl group, $R^2$ is each independently a substituted or unsubstituted $C_1$-$C_6$ alkyl group, $R^3$ is hydrogen, a substituted or unsubstituted $C_2$-$C_6$ alkenyl group, or $C_6$-$C_{18}$ is aryl group, $R^4$, $R^5$, $R^6$, $R^7$ and $R^8$ are each independently hydrogen or a substituted or unsubstituted $C_1$-$C_{18}$ is monovalent hydrocarbon group, and n is an integer of 3 to 8, with the proviso that at least two of $R^3$, $R^4$, $R^5$, $R^6$, $R^7$ and $R^8$ are hydrogen, and at least two thereof are a substituted or unsubstituted $C_2$-$C_6$ alkenyl group.

8. The method of claim 7 wherein $R^1$ is methyl, $R^2$ is each independently methyl or ethyl, $R^3$ is each independently hydrogen, vinyl or phenyl, $R^4$, $R^5$, $R^6$, $R^7$ and $R^8$ are each independently hydrogen, methyl, vinyl or phenyl, and n is 4 or 5.

* * * * *